Figure 2:
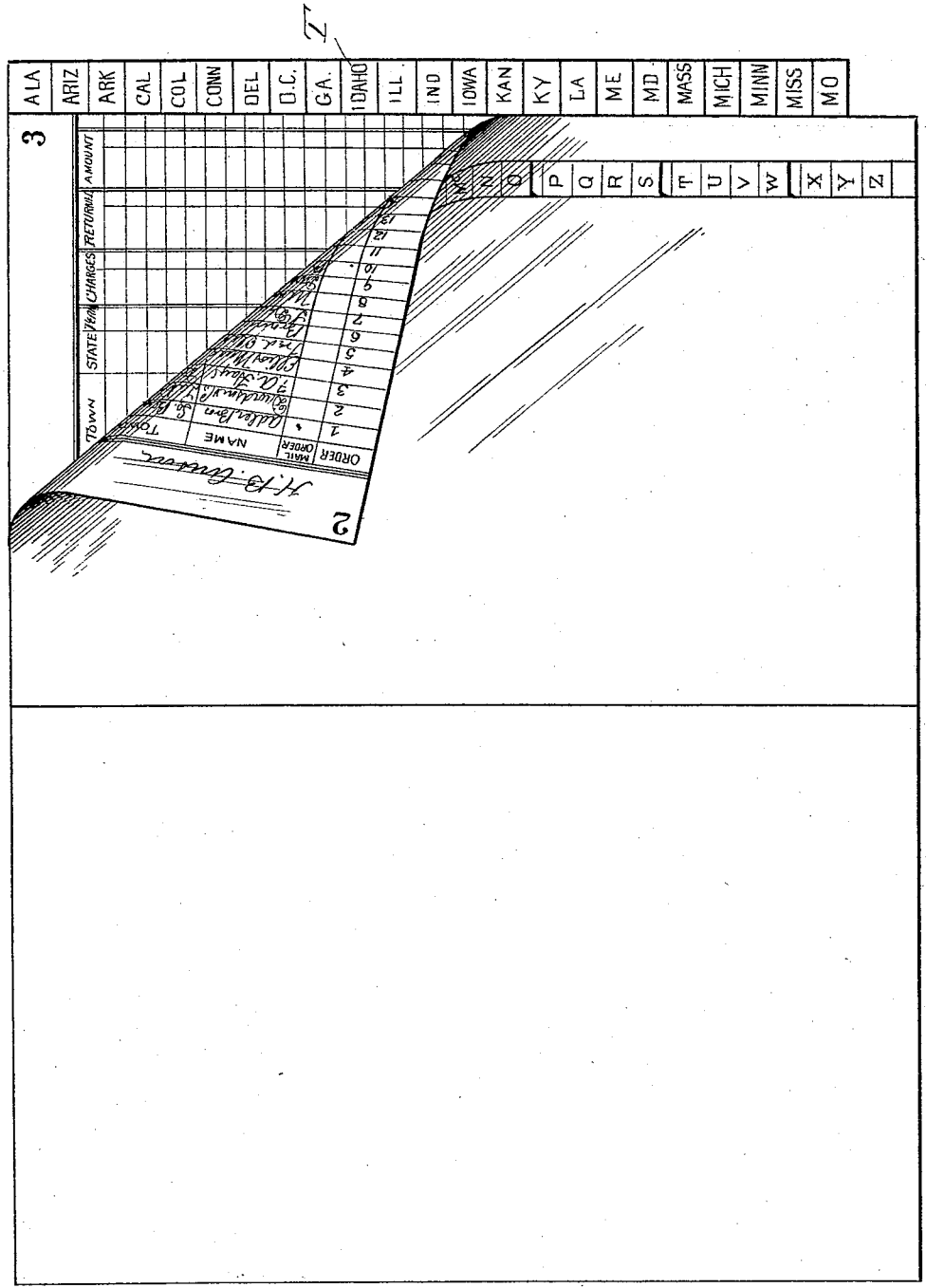

(No Model.)

2 Sheets—Sheet 1.

C. C. KROUSE.
RECORD BOOK.

No. 495,253.                     Patented Apr. 11, 1893.

Fig. 1.

Inventor
Chas C. Krouse
by Ellis Green
Atty

Attest
William McAdden
F. L. Middleton (No Model.) 2 Sheets—Sheet 2.

C. C. KROUSE.
RECORD BOOK.

No. 495,253. Patented Apr. 11, 1893.

Attest
Walter Donaldson
F. L. Middleton

Inventor
Chas C. Krouse
by Ellis Spear
Atty

UNITED STATES PATENT OFFICE.

CHARLES C. KROUSE, OF WILLIAMSPORT, PENNSYLVANIA.

RECORD-BOOK.

SPECIFICATION forming part of Letters Patent No. 495,253, dated April 11, 1893.

Application filed May 24, 1892. Serial No. 434,197. (No model.)

*To all whom it may concern:*

Be it known that I, CHARLES C. KROUSE, a citizen of the United States of America, residing at Williamsport, in the county of Ly-coming and State of Pennsylvania, have invented certain new and useful Improvements in Record-Books, of which the following is a specification.

My invention is an improved record book of the class designed for wholesale accounts.

The object of the invention is to simplify the keeping of the accounts where orders are received and filled from different places in all parts of the country, whether by mail, or through selling agents and to render it easy to turn readily and certainly to any particular account; to keep an accurate, conspicuous and readily accessible account of the sales, whether made through selling agents or whether orders are received by mail, the account showing accurately the record made by each salesman.

My invention is illustrated in the accompanying drawings in which:—
Figure 1 shows the record book open, this figure representing the manner of indexing as well as the construction of the page. Fig. 2 represents a page of the indexing and the account for the selling agents.
The book is of the general form of such account books; the one which I particularly describe is designed for houses doing a whole sale business in different States of the Union. The book is subdivided, the particular subdivisions being set apart for every State in size and proportion to the particular State as to the amount of trade. These subdivisions are indicated by tags T, glued and arranged in the ordinary manner upon the edges of the leaves. Each subdivision appropriated to a State is further subdivided by an interior index formed by printing the letters of the alphabet in order upon the margins of the leaves of the subdivisions, the parts below the said letters being cut away in the ordinary manner to disclose the remaining letters. The pages of the subdivisions thus marked with the interior indexing, are constructed with lines and subdivisions as shown in Fig. 1.
All the pages have horizontal rulings of ordinary construction. The improvement in this particular consists in the construction of the subdivisions formed by the vertical lines which for perspecuity are in red lines as usual. The particular order of the columns from left to right is not material but I describe them in the order shown. The first formed by the line $a$ is designed for the record of the towns in which the transaction to be recorded takes place. As shown in Fig 1, a number of entries of this character may be made upon the same page, several lines being allowed for any one town for the amount of trade required. The next column, preferably of the same dimensions, formed by the addition of the vertical line $b$, contains the record of the names of the parties with whom the business transactions have been had, the name of the party being opposite or on the same line with the name of the town in which he does business. The remainder of the page is occupied by a series of groups or groups of columns. These groups are marked 1, 2, 3, 4 and 5, and each group consists of squares formed by vertical lines $c$, $d$, $e$ and $f$. The first column of squares in the subdivision contains spaces for the record of the name or sign of the particular salesman who makes the sale to the party recorded in the second column heretofore described, on the line opposite or next below the square which contains the designation of the salesman. The second column is headed "Order" for the number of the order; the third "Mail" for note of mail orders and the fourth is headed "Date." All the others following are the same as these last described and these form subdivisions formed by the lines $c$, $d$, $e$ and $f$ form one group. Preferably I subdivide the space formed by the cross lines by a secondary horizontal line $g$ which makes two sets of squares appropriated to the name on the main line $h$.

The arrangement of parts as above described gives ordinarily a sufficient amount of space for the record of any one person, but the space may be enlarged to any extent, by leaving blank lines below the first before making the entry of another name as illustrated on the page shown. Thus the record on the page shown in Fig. 1 exhibits at a glance the place, the customer or party giving orders; the orders, and whether by agent or mail, and then the date, and the order of the transaction and the page is readily accessible by means of this subordinate system of indexing.

The part of the record above described, it will be observed, is constructed on the basis of locality and the arrangement of the record is determined by the initials of the name of the place; this leaves the record of the selling agents scattered promiscuously. In order to consolidate the record of individual selling agents and have every one's record separate and distinct, I provide a supplemental record made subordinate to but an essential part of the book above described. This book or record has an ordinary index for the purpose of holding a record arranged according to the initials of the names of the selling agents mail orders being entered under "M." The supplemental part itself is made up of pages such as that shown in Fig. 2. It is printed with horizontal lines in the ordinary manner and is constructed also with vertical lines forming columns, the first of which (marked "Order") is to receive the numbers of the orders sent in by the selling agents. The second marked "Mail order" is to receive the number of the mail orders. The third column counting from the left has the heading of "Name" and is designed for the entry of the names of the customers. The fourth column marked at the head "Town" is for the entry of the names of the town opposite the respective customers and the fifth column is for the record of the State. The sixth column is headed "Terms" and is for the entry of a letter or mark indicating the terms whether regular or special. The seventh column is for charges as to extra discounts, &c. The eighth column marked "Return" is a column for the record of the amounts returned and the ninth column headed "Amount" contains the record of the amounts of sales. The name of the salesman whose record is on any given page is placed at the head of the page as in the drawings.

The index to these pages above described makes it easy to find the page of any given selling agent the number of the page being indicated opposite his name in the index. The page when found shows consecutively, the numbers of orders, customers, amounts, and in brief the whole record relating to his transactions.

Upon the book constructed and arranged as above described the record of the wholesale business may be kept up simply and easily entered and any particular item whether of place or salesman may be very readily found.

I claim as my invention—

1. A record book having upon the margin a series of tags containing the State or large sub-division, and a subordinate indexing of each one of said sub-divisions within said tags and upon the margin of larger sub-divisions; and having also pages provided with columns, two of which are broader, and have at the head respectively the name of the town and the name of the customer combined with groups of smaller columns, marked "Salesman" orders or date and so on, these groups being arranged in series by the side of broader columns, and the vertical columns being also sub-divided by horizontal lines as set forth.

2. In combination with a record book, having a series of tags containing the names of States or larger sub-divisions, and a subordinate indexing of each one of said sub-divisions on the margin of the leaves, by the side of the said tags; and having also leaves marked into two broad columns for the name of the town and the name of the customer, having also a series of groups of sub-divisions vertical columns., in combination with supplemental book, containing an index for names and a page having the ordinary ruling having also a series of vertical columns marked, "Order," "Mail Order" "Name" "Town" and "State" "Terms," "Charges return and amount" respectively all substantially as described.

In testimony whereof I affix my signature in presence of two witnesses.

CHARLES C. KROUSE.

Witnesses:
 CLARENCE E. SPROUT,
 CLEON E. KROUSE.